H. W. PLEISTER AND J. KARITZKY.
CABLE CLAMP AND BRIDLE RING.
APPLICATION FILED OCT. 4, 1919. RENEWED DEC. 17, 1920.
1,365,612. Patented Jan. 11, 1921.
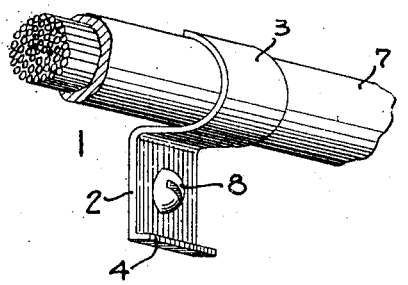
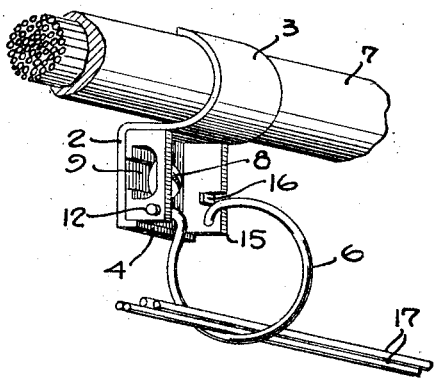
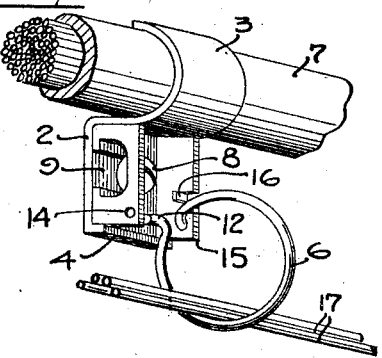
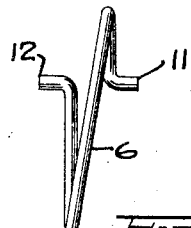
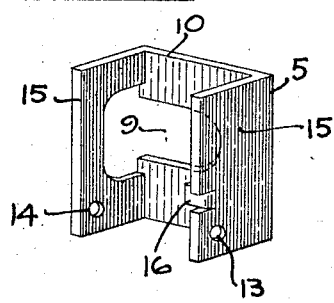
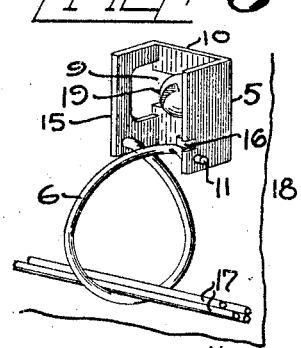
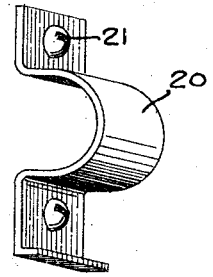
INVENTORS
Henry W. Pleister
John Karitzky
BY
Alexander Johnson
ATTORNEY

UNITED STATES PATENT OFFICE.

HENRY W. PLEISTER, OF WESTFIELD, AND JOHN KARITZKY, OF GARWOOD, NEW JERSEY, ASSIGNORS TO HENRY B. NEWHALL, JR., EXECUTOR OF HENRY B. NEWHALL, DECEASED.

CABLE-CLAMP AND BRIDLE-RING.

1,365,612.         Specification of Letters Patent.         Patented Jan. 11, 1921.

Application filed October 4, 1919, Serial No. 328,529. Renewed December 17, 1920. Serial No. 431,501.

*To all whom it may concern:*

Be it known that we, HENRY W. PLEISTER, a citizen of the United States, residing at Westfield, in the county of Union and State of New Jersey, and JOHN KARITZKY, a citizen of the United States, residing at Garwood, in the county of Union and State of New Jersey, have invented certain new and useful Improvements in Cable-Clamps and Bridle-Rings, of which the following is a specification, taken in connection with the accompanying drawings.

Our invention relates to the combination of a conduit and cable clamp and bridle ring, and also to a cable or conduit clamp and bridle ring as sub-combinations of the main combination, and as articles of manufacture.

Our invention further relates to a cable and conduit clamp, which can be manufactured at minimum expense and to which a bridle ring may be secured either at the original installation of the cable and conduit clamp, or at any future time when it may be desirable to support one or more runs of bridle wires.

Our invention further relates to a nonthreaded bridle ring, which may be used in combination with the conduit or cable clamp or independently. It further relates to such a bridle ring, which can be formed of relatively small gage wire. It further relates to such a bridle ring, which will form a complete closed loop around the bridle wire, or strands of bridle wires, and thereby prevent any accidental disengagement of the bridle wire from the bridle ring.

Our invention further relates to certain combinations, sub-combinations, articles of manufacture, and details of construction, all of which will be more fully hereinafter described and pointed out in the claims.

In the figures, in which we have shown one embodiment of our invention, the same reference numerals refer to similar parts in the several figures.

Figure 1 is a perspective view of our improved conduit and cable clamp;

Fig. 2 is a perspective view similar to Fig. 1, but with the addition of our bridle ring;

Fig. 3 is a perspective view of the complete combination of conduit or cable clamp and bridle ring, showing the manner of attaching the bridle ring to its carriage;

Fig. 4 is a plan view of the bridle ring;

Fig. 5 is a perspective view of the bridle ring support or carriage;

Fig. 6 is a perspective view of the bridle ring with its support or carriage used independently to support runs of bridle wires; and Fig. 7 is a detail view of a modification showing a two-hole cable clamp which may be used with our invention.

Previous to our invention bridle rings have been used with conduit and cable clamps. These bridle rings are what are known as "pig-tail," having one of their ends provided with machine screw threads to coöperate with machine female screw threads in the heel of the cable clamp. This has necessitated an extra thickness of metal in the heel of the conduit or cable clamp so as to provide sufficient female threads to support the shank of the commercial pigtail bridle ring. When the cable clamp was formed of sheet metal the customary way to get this additional thickness of metal in the heel was to bend over sufficient additional metal to double the thickness of the metal in the heel. This necessitated the use of a large additional quantity of sheet metal with the consequent increase in cost of the resulting cable or conduit clamp. Attempts have been made to secure the conduit or cable clamp to a wall or other support by means of a pig-tail bridle ring provided with wood screw threads, but it has been found in practice that this is not satisfactory.

A bridle ring provided with wood screw threads can be used separately in wood but cannot be used successfully as a supporting means for the cable clamp. A bridle ring provided with machine screw threads can be used on a cable clamp, which has had its heel thickened and tapped with machine screw threads, but such a bridle ring provided with machine screw threads cannot be used independently in a wood or stone structure to support one or more bridle wires.

By our invention our bridle ring may be used with a conduit or cable clamp, or may be used independently to support strands of bridle wires on a wall or other support.

In the commercial use of conduit and cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By our invention our conduit and cable clamp may be used as a separate article of manufacture or sub-combination, and then later, when the needs of the service demands it, our bridle ring may be supported by the same conduit or cable clamp, when the complete combination would be used.

In our invention the cable clamp 1 is preferably formed out of sheet metal having a heel 2, and a hook portion 3, of the same thickness. On the heel we bend up a small flange 4 to coöperate and assist in holding the support or carriage 5, to which is secured the bridle ring 6. The cable 7 is secured in position by the cable and conduit clamp 1 held by the screw or other fastening means 8. At some future time, when the telephone engineers may desire to string runs of bridle wires parallel with the cable 7, it is merely necessary for the telephone lineman to loosen the screw 8 sufficiently to permit the screw to be received in the slot 9, in the base 10 of the carriage or support 5. The carriage is then slipped under the head of the screw 8 at right angles to the longitudinal axes of the cable clamp, as shown in Figs. 2 and 3. The screw then is tightened so that the head will firmly bind the base 10, with which it contacts. The flange 4 serves to assist in holding the carriage 5 in position on the cable clamp and also acts as a guide to position the carriage.

Our bridle ring 6 has its ends 11 and 12 bent out at an angle to form engaging arms or surfaces to coöperate with the openings 13 and 14 in the sides 15, 15 of the support or carriage 5. After the screw 8 has been tightened, the bridle ring 6 can be readily positioned by placing one end 11 in the hole 13, for example, and then compressing the bridle ring so that its end 12 is received within the other side 15, when by simple manipulation the end 12 will snap into the hole 14, and be then securely held. Preferably, though not necessarily, we provide the support or carriage with a stop or finger 16 formed by bending down a portion of one of the sides 15, so that it will engage with the bridle ring 6. This insures that the bridle ring will be firmly and immovably held on the carriage and will keep its correct position.

In some cases it may be desirable to use our bridle ring to string runs of bridle wire independent of the cable clamp. We have shown such a use of our invention in Fig. 6, where the runs of bridle wire 17, 17 are supported upon the wall or support 18 by means of the bridle ring 6, support 5 and the screw 19.

Our invention is also adapted to be used with a two-hole cable clamp 20, Fig. 7, having holes 21, 21 for two screws or other securing members and provided with the flange 22.

It will be noted that in our improved construction there is but one minimum thickness of metal in the heel of the conduit or cable clamp; that no tapping or screw threading of the heel is required; that no screw threads on the bridle ring are necessary or desirable; that much thinner and lighter wire can be used to form our bridle ring than can be used in the ordinary commercial form of pig-tail bridle ring; and that a closed loop is formed around the strands of bridle wires so that they cannot become disengaged from the bridle ring.

Having thus described this invention in connection with illustrative embodiments thereof, to the details of which we do not desire to be limited, what is claimed as new and what is desired to secure by Letters Patent is set forth in the appended claims.

What we claim is,—

1. A conduit and cable clamp having a hook portion and a heel portion, and a bridle ring support adapted to be secured to the clamp by slipping it under the head of the supporting screw at an angle to the longitudinal axis of the clamp, and a bridle ring carried by the bridle ring support.

2. A conduit and cable clamp having a hook portion and a heel portion, the heel portion being provided with a flange, a bridle ring carriage having a base with a slot at substantially right angles to the plane of the bridle ring, a bridle ring carried by the carriage, said carriage adapted to be seated under the head of a screw securing the clamp by slipping it under said head at an angle to the longitudinal axis of the clamp.

3. A new article of manufacture comprising a bridle ring support and bridle ring, the support being provided with a base slotted at right angles to the plane of the bridle ring, and also being provided with sides having openings to receive both ends of a bridle ring, and with a finger or stop to engage the bridle ring and hold it in its correct position, and a bridle ring.

4. A conduit and cable clamp having a hook portion and a heel portion, and a bridle ring support adapted to be secured to the clamp by slipping it under the head of the supporting screw at an angle to the longitudinal axis of the clamp, a bridle ring carried by the bridle ring support, said bridle ring support being provided with a finger or stop to engage the bridle ring and cause it to assume its correct position.

5. A conduit and cable clamp formed from sheet metal having a single thickness of metal for both the heel and hook portions, a flange on the heel portion, a bridle ring support having a base slotted at right angles to the plane of the bridle ring to permit it to be positioned at right angles to the longitudinal axis of the clamp, and a bridle ring having both its ends secured to the bridle ring support.

6. A conduit and cable clamp formed from sheet metal having a single thickness of metal for both the heel and hook portions, a flange on the heel portion, a bridle ring support having a base slotted at right angles to the plane of the bridle ring to permit it to be positioned at right angles to the longitudinal axis of the clamp, and a bridle ring having both its ends secured to the bridle ring support, and a finger carried by the support to engage and position the bridle ring.

7. A conduit and cable clamp formed from sheet metal having a single thickness of metal for both the heel and hook portions, a flange on the heel portion, a bridle ring support having a base slotted at right angles to the plane of the bridle ring to permit it to be positioned at right angles to the longitudinal axis of the clamp, and a bridle ring having both its ends secured to the bridle ring support, a finger or stop on the bridle ring support, and a closed bridle ring being held in position by the finger and supported by the flange on the heel of the clamp.

8. A new article of manufacture comprising a bridle ring support provided with a base and two sides, the base and one of the sides being provided with a slot to receive a screw, and the sides being provided with engaging surfaces to coöperate with a bridle ring.

9. A new article of manufacture comprising a bridle ring support provided with a base and two sides, the base and one of the sides being provided with a slot to receive a screw, and the sides being provided with engaging surfaces to coöperate with a bridle ring, and a bridle ring having its two ends secured in the said engaging surfaces.

10. A new article of manufacture comprising a bridle ring support provided with a base and two sides, the base and one of the sides being provided with a slot to receive a screw, and the sides being provided with engaging surfaces to coöperate with a bridle ring, and one of the sides being provided with a stop or finger.

HENRY W. PLEISTER.
JOHN KARITZKY.

Witnesses:
A. M. WILLIAMS,
M. R. RYAN.